US006967006B1

(12) United States Patent
Wirth et al.

(10) Patent No.: US 6,967,006 B1
(45) Date of Patent: Nov. 22, 2005

(54) METHOD FOR MOUNTING AND INSULATING CERAMIC MONOLITHS IN AN AUTOMOBILE EXHAUST SYSTEM AND A MOUNTING PRODUCED ACCORDING TO THIS METHOD

(75) Inventors: Georg Wirth, Kirchheim (DE); Siegfried Wörner, Esslingen (DE); Peter Zacke, Albershausen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 09/582,548

(22) PCT Filed: Jan. 9, 1999

(86) PCT No.: PCT/EP99/00087

§ 371 (c)(1),
(2), (4) Date: Aug. 7, 2000

(87) PCT Pub. No.: WO99/39086

PCT Pub. Date: Aug. 5, 1999

(30) Foreign Application Priority Data

Jan. 28, 1998 (DE) ................................ 198 03 063

(51) Int. Cl.[7] .......................... B01D 53/34; B32B 5/16; F01N 3/28

(52) U.S. Cl. ...................... 422/179; 422/180; 422/221; 422/222; 428/324; 428/327; 428/920

(58) Field of Search ................................ 422/179, 168, 422/177, 180, 181, 221, 222; 428/91, 913, 428/213, 57, 77, 324, 327, 920, 354, 921, 428/102

(56) References Cited

U.S. PATENT DOCUMENTS

| | | | | | |
|---|---|---|---|---|---|
| 4,589,516 | A * | 5/1986 | Inoue et al. | ................ | 181/256 |
| 4,598,790 | A * | 7/1986 | Uesugi et al. | ............. | 181/252 |
| 4,617,176 | A * | 10/1986 | Merry | ........................ | 422/179 |
| 5,008,086 | A * | 4/1991 | Merry | ........................ | 422/180 |
| 5,028,397 | A * | 7/1991 | Merry | ........................ | 422/179 |
| 5,094,073 | A * | 3/1992 | Worner et al. | ................ | 60/299 |
| 5,290,522 | A * | 3/1994 | Rogers et al. | ............. | 422/179 |
| 5,332,609 | A * | 7/1994 | Corn | ........................... | 428/77 |
| 5,384,188 | A * | 1/1995 | Lebold et al. | ............. | 442/414 |
| 5,882,608 | A * | 3/1999 | Sanocki et al. | ............ | 422/179 |
| 6,017,498 | A * | 1/2000 | Harding | ...................... | 422/179 |
| 6,051,193 | A * | 4/2000 | Langer et al. | ............. | 422/179 |
| 6,162,404 | A * | 12/2000 | Tojo et al. | .................. | 422/179 |
| 6,245,301 | B1 * | 6/2001 | Stroom et al. | ............. | 422/179 |
| 6,365,267 | B1 * | 4/2002 | Langer et al. | ............. | 428/324 |
| 2001/0046456 | A1 * | 11/2001 | Langer et al. | ............. | 422/179 |
| 2001/0051116 | A1 * | 12/2001 | Hornback, III et al. | ..... | 422/179 |

FOREIGN PATENT DOCUMENTS

| | | | |
|---|---|---|---|
| DE | 3835841 | C2 | 4/1990 |
| DE | 42 01 426 | A1 | 7/1993 |

(Continued)

*Primary Examiner*—Kevin P. Kerns
(74) *Attorney, Agent, or Firm*—McGlew and Tuttle, P.C.

(57) ABSTRACT

A special bearing mat (4) is used for mounting and insulating ceramic monoliths (1, 2) in a preferably oval housing (3) of an automobile exhaust system (20), especially for non-round housing cross sections. The bearing mat (4) and/or said housing is/are specially structured and/or chemically treated, especially impregnated at the points which are at risk of eroding (A) in order to increase resistance to erosion. The bearing mat (4) is adapted to suit the functioning of the exhaust system (20) during operation and is especially configured with several layers.

12 Claims, 7 Drawing Sheets

FOREIGN PATENT DOCUMENTS

| | | | | |
|---|---|---|---|---|
| DE | 43 05 198 | C1 | | 5/1994 |
| DE | 29611788 | U1 | | 10/1996 |
| DE | 297 09 180 | U1 | | 10/1997 |
| EP | 0387422 | B1 | | 9/1989 |
| EP | 0 366 484 | A2 | | 5/1990 |
| EP | 0472009 | B1 | | 2/1992 |
| EP | 0 551 532 | A1 | | 7/1993 |
| EP | 0 719 912 | A1 | * | 3/1996 |

* cited by examiner

METHOD FOR MOUNTING AND INSULATING CERAMIC MONOLITHS IN AN AUTOMOBILE EXHAUST SYSTEM AND A MOUNTING PRODUCED ACCORDING TO THIS METHOD

FIELD OF THE INVENTION

The present invention pertains to a process for holding or mounting and insulating ceramic monoliths in a motor vehicle exhaust gas unit, with a housing (pipe or half shells) preferably having a nonround (e.g., oval or triangular) cross section and with one or more inner ceramic monoliths of a corresponding cross section, wherein the ceramic monolith is wrapped with a mounting mat and is mounted in the housing and the mounting mat may have at least one swelling mat, which is a mixture of ceramic fibers, expanded mica and organic binder. The present invention also pertains to a mount itself manufactured according to the above-described process.

BACKGROUND OF THE INVENTION

Mainly a swelling mat—a mixture of ceramic fibers, vermiculite micas and organic binders—is currently used to hold and insulate ceramic monoliths in motor vehicle exhaust gas units. The felt mat is wrapped around the monoliths and is pressed in height and thickness by insertion and closing the housing (or by pushing into a pipe or wrapping around with an open pipe and tensioning and closing the pipe). As a result, the swollen mat builds up a compressive strength against the monolith and the housing and holds the ceramic monoliths in the exhaust gas unit by friction between the monolith and the swelling mat, on the one hand, and between the housing and the swelling mat, on the other hand, under load exerted by the forces occurring during the operation (pressure loss on the monolith, acceleration forces on the system). When the temperature rises during the operation, the holding forces of the swelling mat increase due to the thermal tensioning of the vermiculite against the ceramic fibers. The pressing of the swelling mat increases with rising temperature and also with increasing friction. This functions very well in the case of round catalytic converters with uniform, circular gap. The swelling mat becomes adjusted with rising temperature considerably more than what the system loses in tension due to the housing pipe widening against the monolith due to thermal expansion. However, geometrically more unfavorable shapes, such as triangles, polygons and flat ovals, so-called racetracks, are also used besides round monoliths to utilize the free cross sections in the tunnel of a vehicle bottom for the largest possible cross-sectional areas of the monolith (to minimize the pressure loss).

In the case of such cross-sectional shapes, the rigidity of the housing is usually not sufficient during assembly or even during the operation to maintain a constant mounting gap for the swelling mat. Expansion by elasticity takes place in the larger radii or in the flatter areas of the housings during assembly and widening additionally takes place during the operation due to the increased pressing of the swelling mat under elevated temperature. This leads to a nonuniform pressure distribution on the circumference. The highest pressures and consequently the strongest holding forces are generated in the small radii of the cross section and the gaps increase at the large radii. However, the erosion resistance of the swelling mat decreases with increasing gaps. It becomes susceptible to gas pulsations penetrating into the swelling mat and to vibrations. The mica grains practically become detached from the composite and break apart the fibers located next to them in the case of small swelling mat thicknesses and very high loads (accelerations, pulsations, temperatures, and rates of temperature change). They create small cavities for themselves in the mat, which become increasingly larger during the further operation and finally lead to the emptying of the mat, to the formation of a nonpurified exhaust gas bypass flow around the monolith and ultimately to the separation of the monolith with complete failure of the system.

To take the above-mentioned problem fundamentally into account, it is proposed according to DE 296 11 788 U1 that more erosion-resistant mat inserts, namely, Saffil inserts, be used in the larger radii of oval housings and monoliths in the case of a composite mat, while the aforementioned swelling mat material can be maintained in the smaller radii as before. To save expensive Saffil in less critical areas, each Saffil insert has recesses or grooves, which extend flush end to end with corresponding projections or tongues of swelling mat sections, in the axial center of the patchwork mat. These individual mat sections are held together by an adhesive tape. The drawback is the sharp-edged, rectangular cut of the tongue-and groove connection at the joints, which continues to be associated with problems in terms of erosion at the projecting corners of the swelling mat and the tongues. Furthermore, difficulties arise in connection with handling and assembly, namely, the problem of projecting corners being caught and of these corners being folded over during the mounting in the half shell or in a tubular housing. Another drawback is the fact that a large amount of waste of the expensive Saffil inserts is generated when the inserts are cut out of a basic mat of the corresponding material. This also applies to the waste generated during the cutting out of the swelling mat sections.

The applicant's own patents DE 38 35 841 ("Soft Intermediate Ring at the End of or Between the Monoliths," EP 0 387 422 ("Ceramic Ring") and EP 0 472 009 ("Wire Mesh Between the Monoliths") shall be referred to concerning other prior art. Both interrupted swelling mats in mounts with a plurality of monoliths and setback swelling mats with edge protection arranged in front of them are described in these patents. The edge protection also consists of fibrous material with sealing function. The use of other materials at the transition between the monoliths in the swelling mat mount in the form of an inner swelling mat protection or of a completely different elastic part is also described there.

SUMMARY AND OBJECTS OF THE INVENTION

Based on the above-mentioned state of the art, the object of the present invention is to provide a process for holding and insulating ceramic monoliths in a housing of an exhaust gas unit of a motor vehicle of the type described in the introduction as well as such a holder or mount itself, which process and holder reliably prevent or at least minimize erosions in defined areas during the operation of the exhaust gas unit by means of simple measures.

According to the present invention the mounting mat and/or the housing are designed chemically and/or structurally by the use of specific individual or combined measures for minimizing the erosion at least in the areas at risk of erosion or in the areas in which damage has occurred.

The mounting mat is built up, in particular, of a plurality of layers and of at least two layers, wherein the individual layers are selected and/or cut in the proper configuration corresponding to the local function of the layer during the operation for minimizing the erosion of the mounting mat as a whole with respect to the material used.

Fiber felts and/or fabric mats, which are assigned to at least one of the following materials or product groups, are preferably used as the temperature- and oxidation-resistant individual mats of the mounting mat:

leached glass,
quartz glass,
aluminum oxide,
mixtures of aluminum oxide and silica,
certain boron and/or zirconium contents.

An individual mat consisting of ceramic fiber fabric, which is composed of the above-mentioned materials, may be used as the preferably inner layer of the mounting mat facing the monolith.

A wire mesh, which is cut preferably narrower in the axial extension than the rest of the mounting mat, is preferably used as the inner support of the mounting mat.

Local, erosion-minimizing areas of thickened material may be introduced into or applied to the individual mat, in which case the individual mat may have indentations or perforations in the area in which the areas of thickened material are introduced or applied, and the said indentations or perforations fit the areas of thickened material in a positive-locking manner, so that a flat top side is formed in the installed or inserted state of the areas of thickened material and thickness and pressure compensation is brought about as a result.

Fibers with a thickness of 6 to 12 μm are preferably used in individual mats in order to avoid health hazards during processing due to the respirability of fibers that are too fine and the skin irritation caused by fibers that are too thick.

Fiber mats which are designed for high and/or low operating temperatures of the exhaust gas unit may be used as the individual mat.

However, swelling mats, which are especially a combination of swelling and fiber mat sections arranged one behind the other, in which the connection joint of the individual swelling and fiber mat sections have a wavy shape, are also used as the individual mat.

In particular, an individual mat or the mounting mat is impregnated at least in the areas at risk of erosion before they are wrapped around the ceramic monolith, the impregnation being performed on the side of the mat facing the monolith with diluted, heat-resistant adhesives made able to penetrate by means of a wetting agent, which are assigned to at least one of the following product groups:

Colloidal solution of silicic acid dissolved in water,
water glass,
alkali siliconates, e.g., potassium methyl siliconate,
monoaluminum phosphate solution,
aluminum chromium phosphate solution.

The adhesive is diluted during the impregnation to the extent that binder is present only in the contact areas between the fibers and optionally between the fibers and the mica.

In addition or as an alternative to this, the mounting mat may also be bonded to the ceramic monolith and/or the housing with a temperature-resistant mat adhesive, in which case the mat adhesive is applied to the inside of the housing and/or to the ceramic monolith and the mounting mat is inserted and mounted wet in the housing.

A mat adhesive used is assigned especially to one of the above-mentioned product groups.

The holding forces between the mounting mat and the housing are preferably brought about in a specific manner by positive locking, especially by increasing the surface roughness, before or during the assembly of the exhaust gas unit.

The surface roughness is increased, in particular, by milling or etching in rough areas, optionally by the use of a mat binder.

A pre-assembled phenolic resin adhesive film may be arranged on the outside of the mounting mat and inserted together with the mounting mat and it can bind on the inside of the housing during the operation of the exhaust gas unit during heating on the outside.

A multilayer mat, which is designed for the function during the operation of the exhaust gas unit, is used especially as a mounting mat in a special mounting of a ceramic monolith in a preferably nonround (e.g., oval or triangular) housing (pipe or half shells) of a motor vehicle exhaust gas unit, using a mounting mat having at least one swelling mat, in which case different swelling mats (with expanded mica) and/or fiber mats (without expanded mica or without granular components) may be provided on the inside and on the outside.

If the mounting mat has one or more fiber mats, the latter are preferably designed as shear-resistant mats.

A shear-resistant fiber mat has, in particular, oblique felt fibers, which extend at a flat angle of 5° to 60° from the underside to the top side of the mat and the ends of the felt fibers are bonded to the interfaces or to the underside and the top side of the mat.

As an alternative, a shear-resistant fiber mat may also have fibers that are arranged in loops over the thickness of the mat, in which case the loops are in contact with and are bonded to the top side and the underside of the mat.

An individual mat or the mounting mat itself is preferably composed in the circumferential direction of a ceramic monolith of swelling mat sections and intercalated fiber mat sections without granular components and without expanded mica, which are associated with the areas at risk of erosion, in which case the connection edges between the swelling mat sections and the fiber mat sections have a joint in a wavy shape and the mounting mat preferably faces the monolith.

The erosion-resistant fiber mat sections have wave-shaped tongues, while the pressure-resistant swelling mat sections have correspondingly wave-shaped cutouts.

The above-mentioned wave-shaped cut is a shape of a blank that is presented as a new cut here and it substantially differs from the sharp-edged, rectangular type of blank according to DE 296 11 788 U1 which was hitherto used. Since it is required for durable systems that the joint be closed on the circumference, the length of the mat is selected to be such that it projects over the circumference (by about 3 mm) and is axially compressed at the joint during assembly as a result. Wave-shaped teeth are substantially more reliable in the process than a sharp-edged tongue-and-groove connection, because they engage one another better, the crumbly ends of the mat do not break off any longer, and projecting tips are no longer hung up during the closing of the half shells or during pushing into a jacket tube with the subsequent displacement and doubling of the mat in these areas. The shape of the wave-shaped teeth is selected to be such that the radii of the individual blanks engage one another and the mats, lying in contact with one another, can be cut out of the web-shaped raw material without cutting waste (cutting with a knife).

As was mentioned above, a preferred embodiment is a multilayer mounting mat, whose individual layers are tailored to the function during the operation of the exhaust gas unit. For example, different swelling mats and/or fiber mats may be provided on the inside and on the outside. Depending on the problems that occur, mats with high elasticity, high erosion resistance, swelling ability at low temperatures, swelling ability at high temperatures, resistance to extremely high temperatures or binders for defined temperatures over the extension of the mat (local) or in the depth of the mat (inner, outer or intermediate layer) are combined in order to obtain optimal function at an acceptable cost.

Especially preferable is, in particular, the bonding of the mats to the monolith and the housing during the operation by means of suitable resin systems on the inside and/or the outside or the increasing of the friction by preparing the surface before or during the assembly (positive locking due to rough areas—milled-in or etched-in roughness, possibly with mat binder) to increase and stabilize the holding forces of the monolith.

An at least optional impregnation of the swelling mats and fiber mats to further increase the erosion resistance without a substantial reduction in elasticity is significant.

If fiber mats are present in a mounting mat, the fiber mats have a high shear resistance in order to transmit holding forces from the transition surfaces of the monolith to the mat and from the sheet metal jacket to the mat. Prior-art fiber mats are manufactured by laying the fibers layer by layer and subsequent needling or bonding. Interfaces, via which the mat slips apart, are formed over the height of the mat in the process. Mats according to the present invention are characterized by a different laying of the fibers and a different bonding of the mat. The individual fibers preferably extend at a flat angle of about 5° to 60° from the underside to the top side of the mat in order to make possible the bonding of the fibers ends at the interfaces in an optimal manner and yet to bring about a sufficient elasticity in the middle. Another possibility of achieving the elasticity and the shear resistance of a fiber mat is the design with loops, which are in contact with the top side and the underside.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 2:
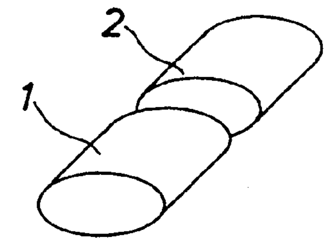
FIG. 2 shows the perspective view of the two oval ceramic monoliths to be introduced into the oval tubular housing.

Referring to the drawings in particular, a mount for holding and insulating two ceramic monoliths 1, 2 of an oval cross section, which are arranged one behind the other, comprises according to FIG. 2 a mounting mat 4 in a correspondingly oval tubular housing 3 of a motor vehicle exhaust gas unit 20.

Figure 18:
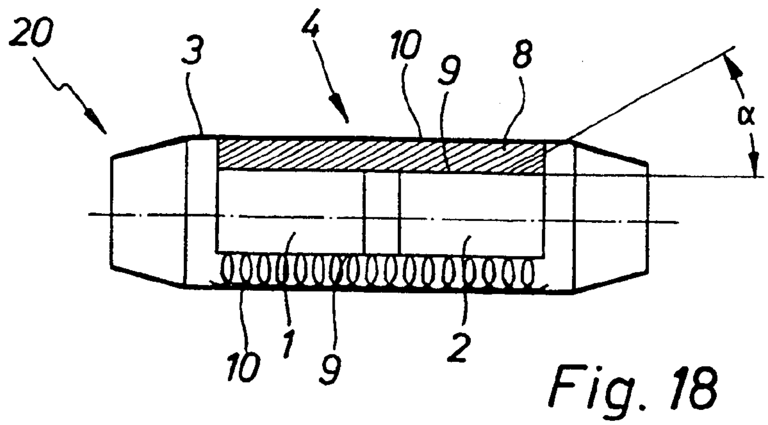
FIG. 18 shows a schematic axial section of an exhaust gas unit according to the present invention, in which a mounting mat for two ceramic monoliths in an oval tubular housing with oblique felt fibers bonded at the end is shown above the axial center line and a mounting mat with fibers in the form of loops is shown under the axial center line.

As is shown in principle in FIG. 18, the mounting mat 4 is wrapped around the two ceramic monoliths 1, 2 and it correspondingly holds the ceramic monoliths 1, 2 in the tubular housing 3.

The mounting mat 4 and/or the tubular housing 3 has/have a special design and/or is/are specially treated chemically as will be specifically described below at least in the areas at risk of erosion A of a mounted mounting mat during the operation of the motor vehicle exhaust gas unit or in the areas in which damage has occurred.

Especially with reference to FIGS. 1 through 17, the mounting mat 4 has a multilayer design and consists of at least two layers, wherein the material of the individual layers is selected corresponding to the function of the layer during the operation and is optionally cut in the proper configuration and/or the material is thickened.

Fiber felts and/or fabric mats which are assigned to at least one of the following materials or product groups are used as temperature—and oxidation-resistant individual layers or individual mats of the mounting mat 4:

- leached glass,
- quartz glass,
- aluminum oxide,
- mixtures of aluminum oxide and silica,
- certain boron and/or zirconium contents.

Ceramic fiber fabrics as well as swelling mats which are a mixture of ceramic fibers, expanded mica and organic binder are also used as individual layers.

Wire mesh 21 or ceramic fabrics which are cut narrower in the axial extension of the mount than the rest of the mounting mat 4 may be used for support.

Areas of thickened material 22, 23 may be locally introduced into or applied to the individual layer as an erosion protection, in which case the individual mat may have indentations or perforations 24, which fit the areas of thickened material in a positive-locking manner, in the area in which the areas of thickened material 22, 23 are introduced or applied.

Fibers with a thickness of 6 to 12 μm are used in the individual mats.

A combination of swelling and fiber mat sections 5, 7 may be provided as individual mats, in which case the connection joint of the individual swelling and fiber mat sections has a wavy shape 11.

The individual mat or the mounting mat 4 may be impregnated at least in the areas A at risk of erosion before being wrapped around the ceramic monolith 1, 2, the impregnation being performed on the side of the mat facing the monolith with diluted, heat-resistant adhesives, which are made able to penetrate by means of a wetting agent and are assigned to at least one of the following product groups:

Colloidal solution of silicic acid dissolved in water, water glass, alkali siliconates, e.g., potassium methyl siliconate, monoaluminum phosphate solution, aluminum chromium phosphate solution.

The adhesive is diluted during the impregnation to the extent that binder is present only in the contact areas between the fibers and optionally between the fibers and the mica.

The mounting mat 4 may be bonded to the ceramic monolith 1, 2 and/or to the tubular housing 3 with a temperature-resistant mat adhesive, in which case the mat adhesive is applied to the inside of the tubular housing 3 and/or to the ceramic monolith 1, 2 and the mounting mat 4 is inserted and mounted wet in the tubular housing 3.

The mat adhesive belongs to the product group of the adhesives that are used for impregnation.

Figure 1:
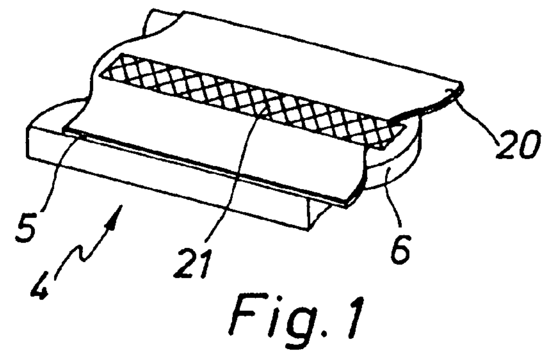
FIG. 1 shows a four-layer mounting mat built up according to the present invention for holding and insulating ceramic monoliths in a tubular housing of oval cross section for a motor vehicle exhaust gas unit in a planar or unwrapped schematic perspective view.
Figure 3:
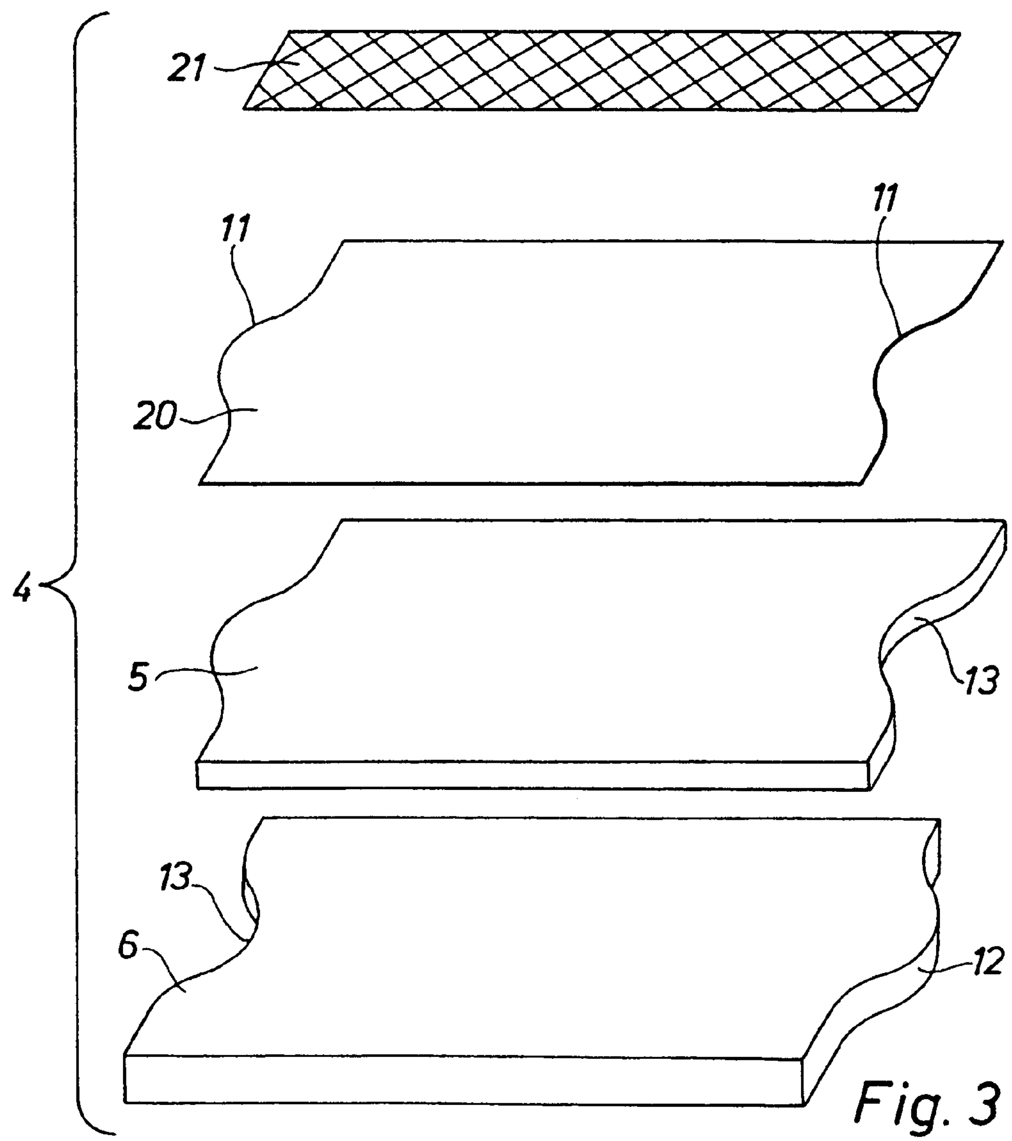
FIG. 3 shows a perspective exploded view of the mounting mat according to FIG. 1.

With special reference to the embodiment variant according to FIGS. 1 and 3, a four-layer mounting mat 4 is provided, whose lowermost layer facing the tubular housing 3 is a swelling mat 6, which is designed for a low temperature with corresponding mica contents in the swelling mat such that sufficient expansion of the swelling mat takes place already at a low operating temperature.

The above-mentioned swelling mat 6 is joined by another swelling mat 5, which is designed for a higher operating temperature with a smaller mica content in the swelling mat.

The swelling mat 5 is joined on the inside by a layer of a ceramic fabric 20, which forms an erosion protection means.

The above-mentioned three individual layers may also be fiber mats, which are designed for low and higher operating temperatures corresponding to the layers 6 and 5 and for erosion protection corresponding to layer 20.

A wire mesh 21 acting as a support for the above-mentioned three layers, which may also be a ceramic fabric, is provided as the fourth layer of the mounting mat 4 facing the monolith 1, 2.

All layers may be bonded to one another as well as to the tubular housing 3 and/or to the monoliths 1, 2 by means of adhesives. The individual layers may have different fiber directions for improved hold of the layers with one another.

It shall be mentioned concerning the configuration of the above-mentioned four individual layers that the wire mesh 21 is cut considerably narrower than the remaining three layers.

The ends on the left and right of the individual layers 6, 5, 20 according to FIGS. 1 and 3 have a wavy shape 11 to create an optimal joint during a 360° wrapping, as was described in the introduction. The layers 5 and 20 now have identical wave-shaped tongues 12 at the left-hand end of the layer and corresponding wave-shaped cutouts 13 at the right-hand end of the layer, while the wave-shaped tongue 12 and the wave-shaped cutout 13 of the layer 6 are provided reversed at the other ends in order to bring about an overlap in the joint area of the individual layers during the wrapping of the mounting mat 4 around the monolith, as can be seen especially in FIG. 1.

Figure 4:
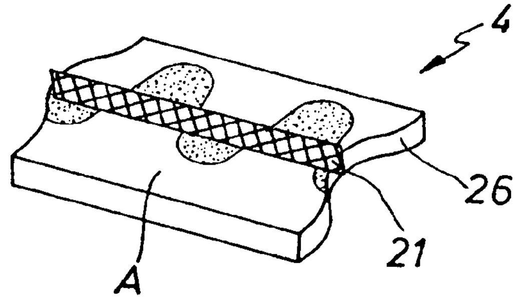
FIG. 4 shows a two-layer mounting mat built up according to the present invention in a view similar to FIG. 1.
Figure 5:
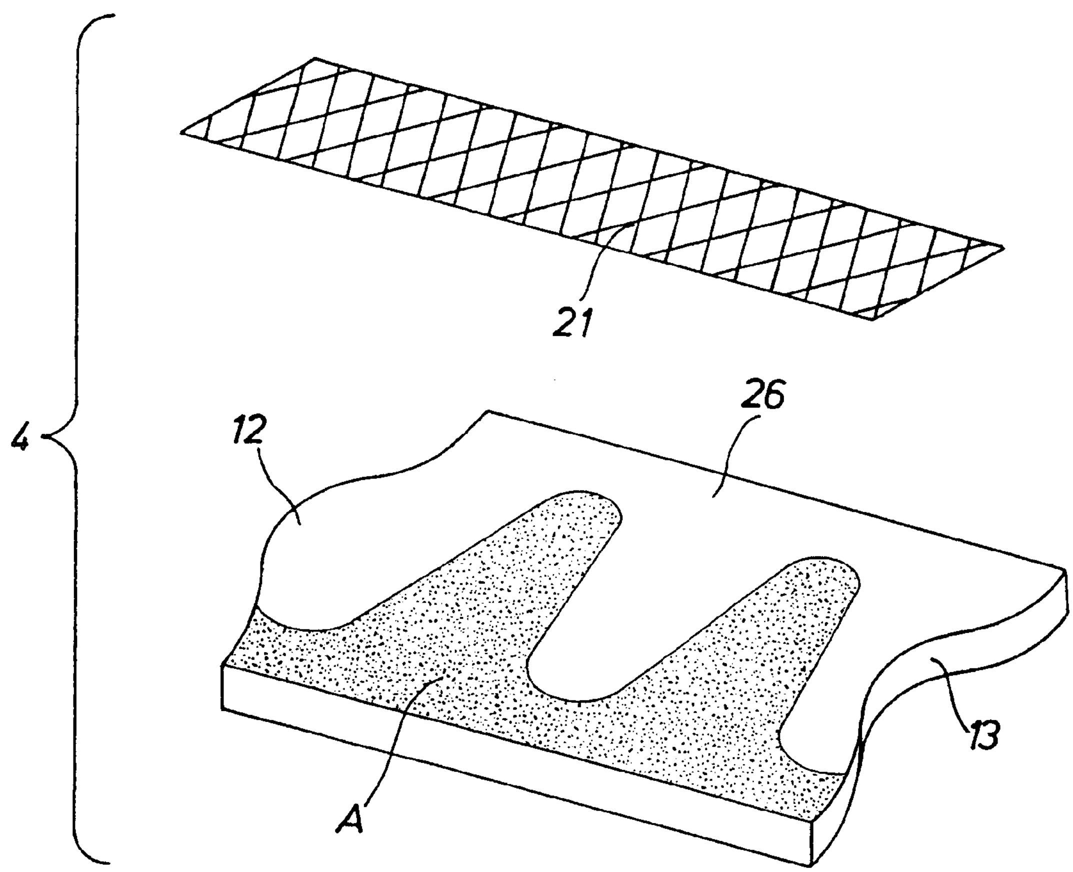
FIG. 5 shows the mounting mat according to FIG. 4 in a perspective exploded view similar to FIG. 3.

The embodiment variant of a mounting mat 4 according to FIGS. 4 and 5 comprises two layers: One holding mat 26 with an inner erosion protection brought about by impregnating the area A at risk of erosion with an adhesive as described above, which may be a swelling mat or a fiber mat, as well as an inner support in the form of a wire mesh 21 or of a ceramic fabric, as in the first exemplary embodiment according to FIGS. 1 and 3. The holding mat 26 has a wavy shape 11 at the end as do the layers 5, 20 in the first exemplary embodiment.

Figure 6:
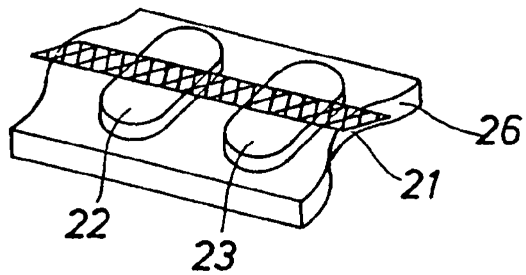
FIG. 6 shows a three-layer mounting mat built up according to the present invention, which is similar to that shown in FIGS. 1 and 4.
Figure 7:
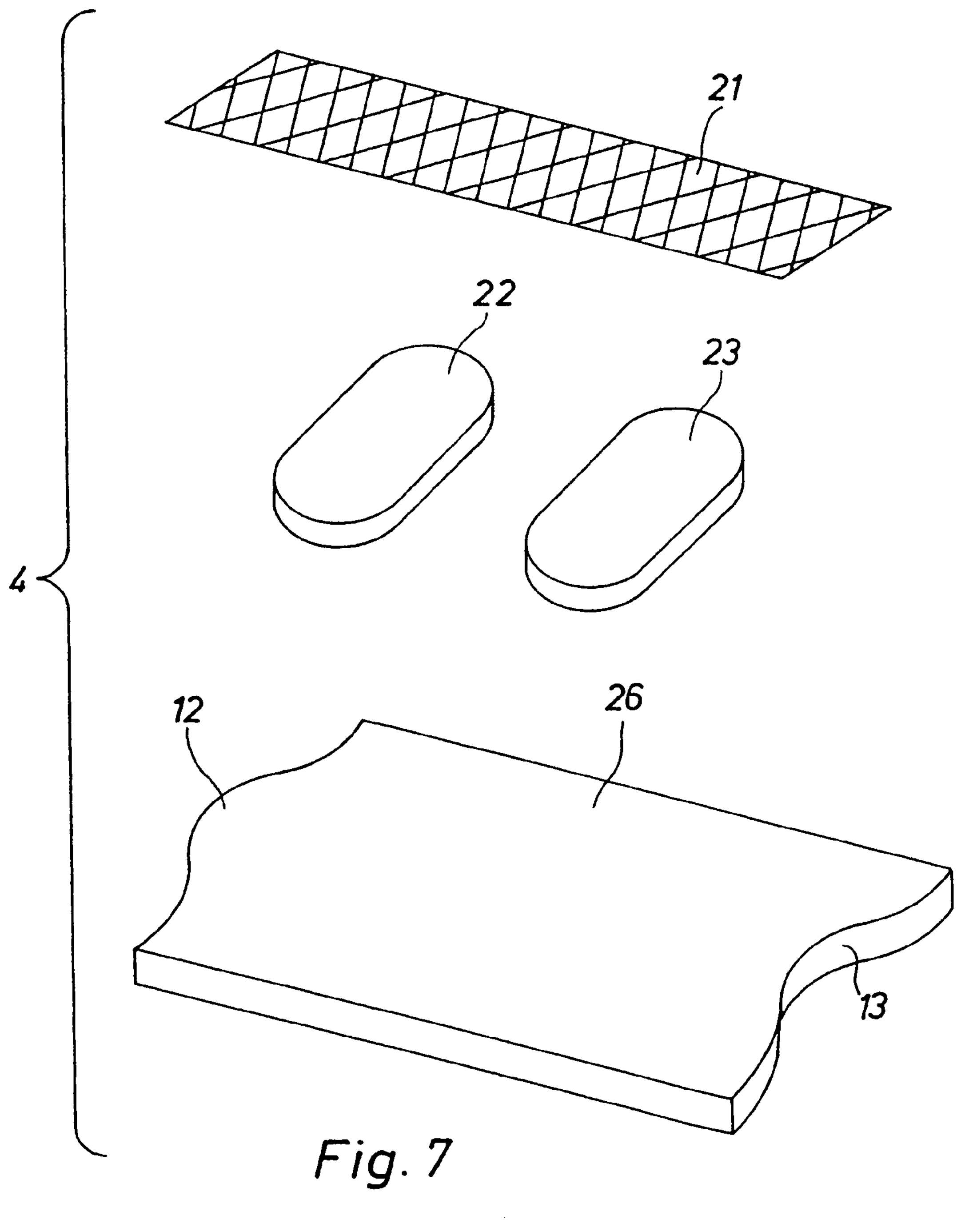
FIG. 7 shows the mounting mat according to FIG. 6 in a perspective exploded view similar to FIGS. 3 and 5.

The third embodiment variant of a mounting mat 4 according to FIGS. 6 and 7 corresponds essentially to that according to FIGS. 4 and 5. However, no impregnation is provided here, but an additional "intermediate layer" is provided instead between the wire mesh 21 and the holding mat 26 in the form of local areas of thickened material 22 and 23 (fiber mat, fiber fabric, braiding), which have an oval shape and a thickness of about 2 mm in the exemplary embodiment shown, to provide erosion protection for areas at risk of erosion A of the holding mat 26 and the swelling mat.

Figure 17:
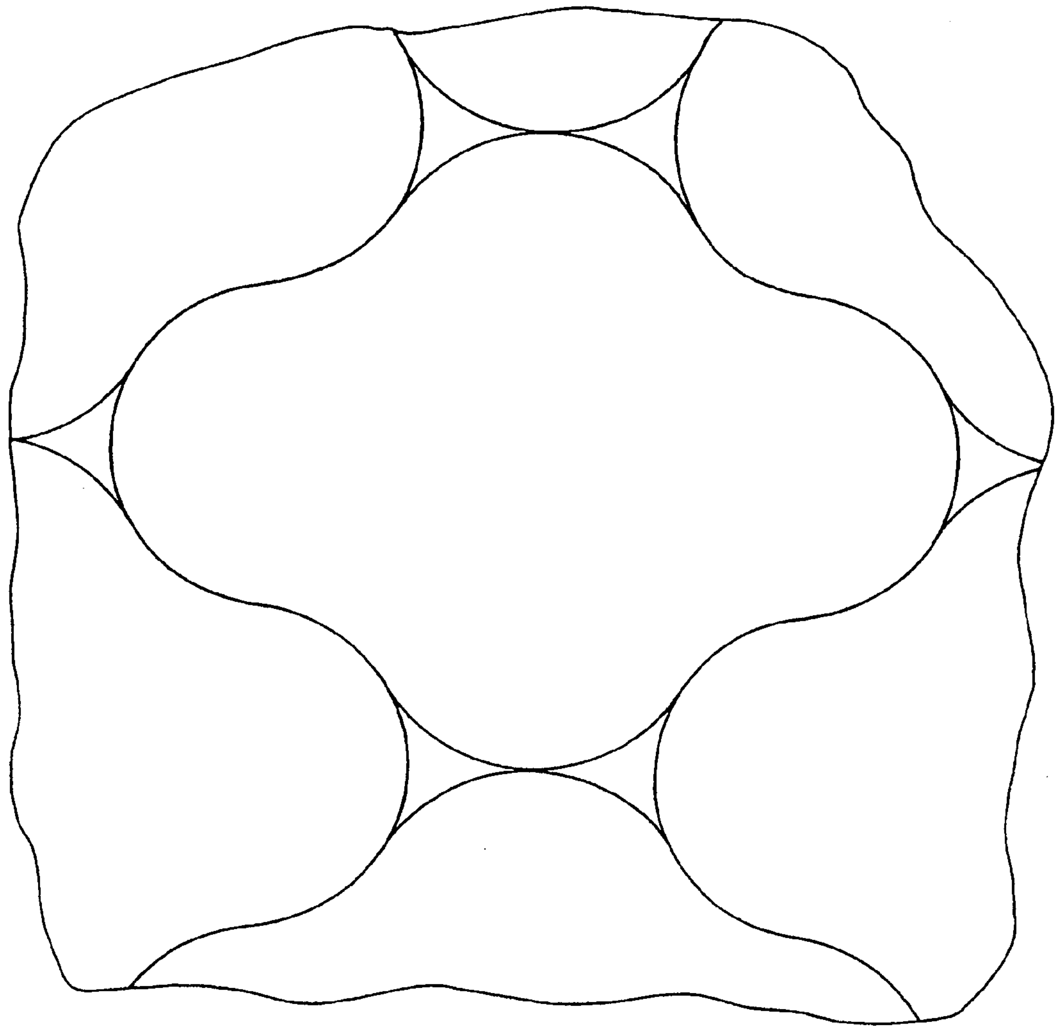
FIG. 17 schematically shows the partial top view of another second layer of a mounting mat according to FIG. 7, where the arrangement of the blank with a small amount of clipping waste is shown corresponding to FIG. 14.

Instead of the oval shape, other configurations may also be considered, e.g., a rounded "cloverleaf shape" of an individual leaf according to FIG. 17, in which case a plurality of "cloverleaves" may be arranged at closely spaced locations next to one another in order to enlarge the area or to enlarge the area protected from erosion, such that practically no intermediate spaces are formed, i.e., larger areas can be covered, optionally using a complete intermediate layer of the size of the holding mat 26.

As can also be seen in FIG. 17, only a small amount of cutting waste of the expensive material is generated in the case of a "cloverleaf shape." Nevertheless, the wavy shape is prepared basically similarly to the individual layers according to FIG. 3 with the advantages associated therewith.

Figure 8:
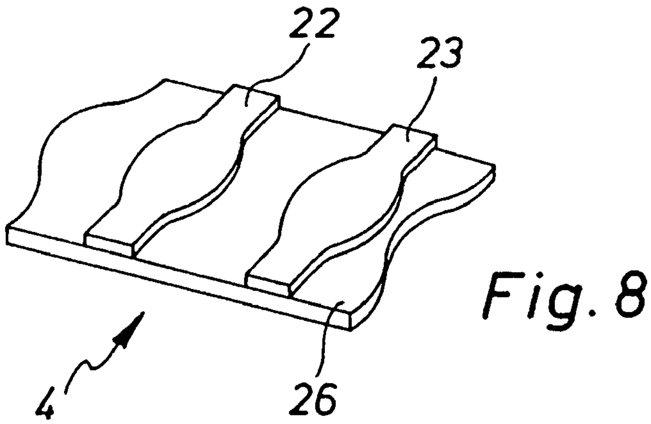
FIG. 8 shows another two-layer mounting mat in a view similar to FIG. 1.
Figure 9:
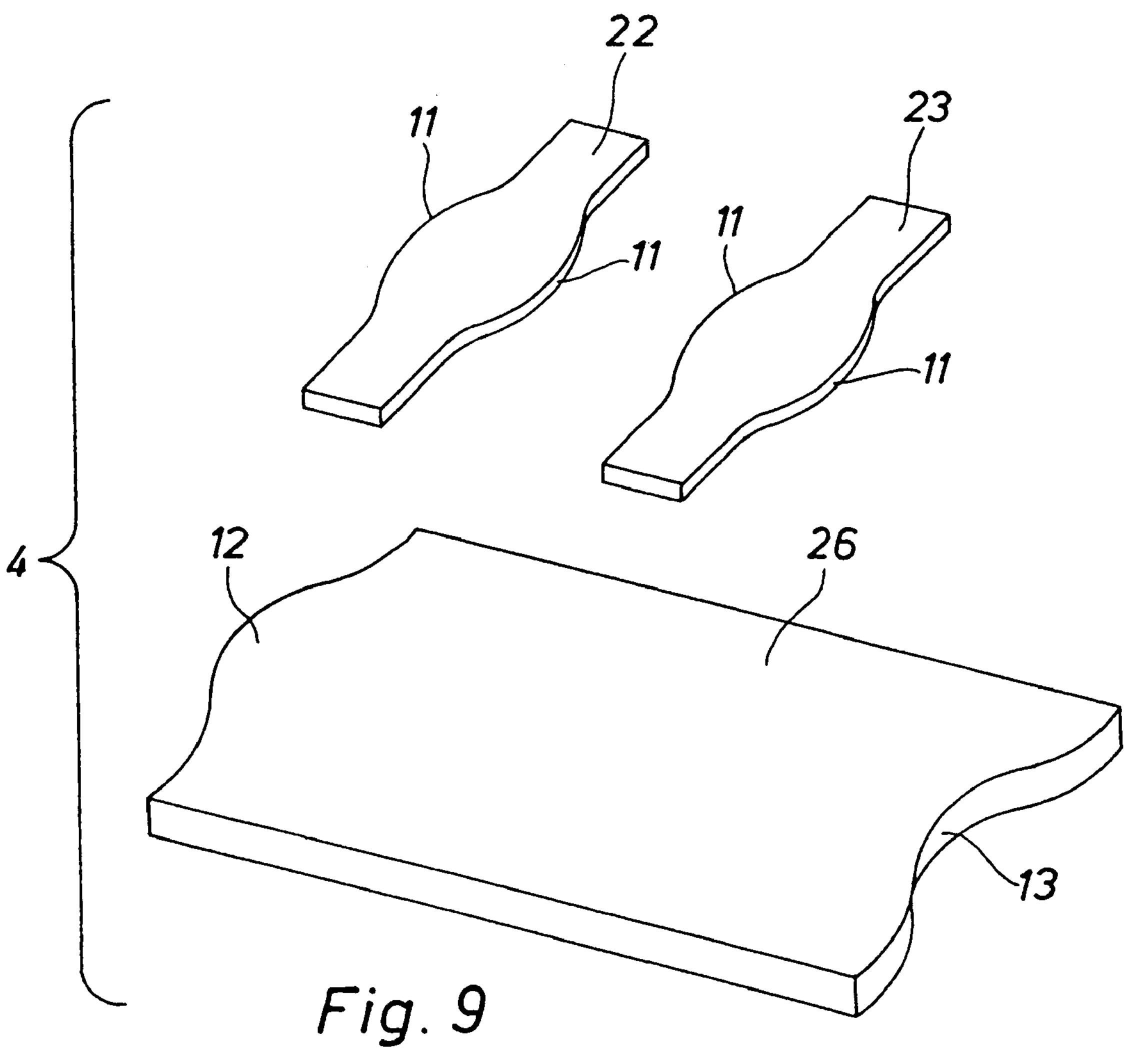
FIG. 9 shows an exploded view of the two-layer mounting mat according to FIG. 8.

The fourth embodiment variant of a mounting mat 4 according to FIGS. 8 and 9 has a two-layer design and has a holding mat 26 in the form of a swelling mat as well as strip-shaped areas of thickened material 22 and 23 in a wavy shape 11 as an erosion protection in the area of erosion hazard A. The strips extend (contrary to the ovals 22, 23 according to FIG. 7) over the entire width of the mounting mat 4.

Figure 10:
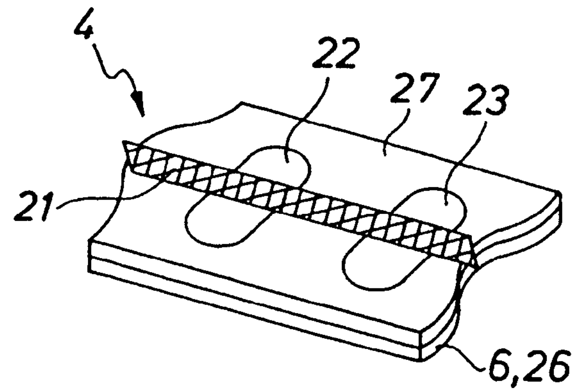
FIG. 10 shows another three-layer mounting mat similar to FIG. 6.
Figure 11:
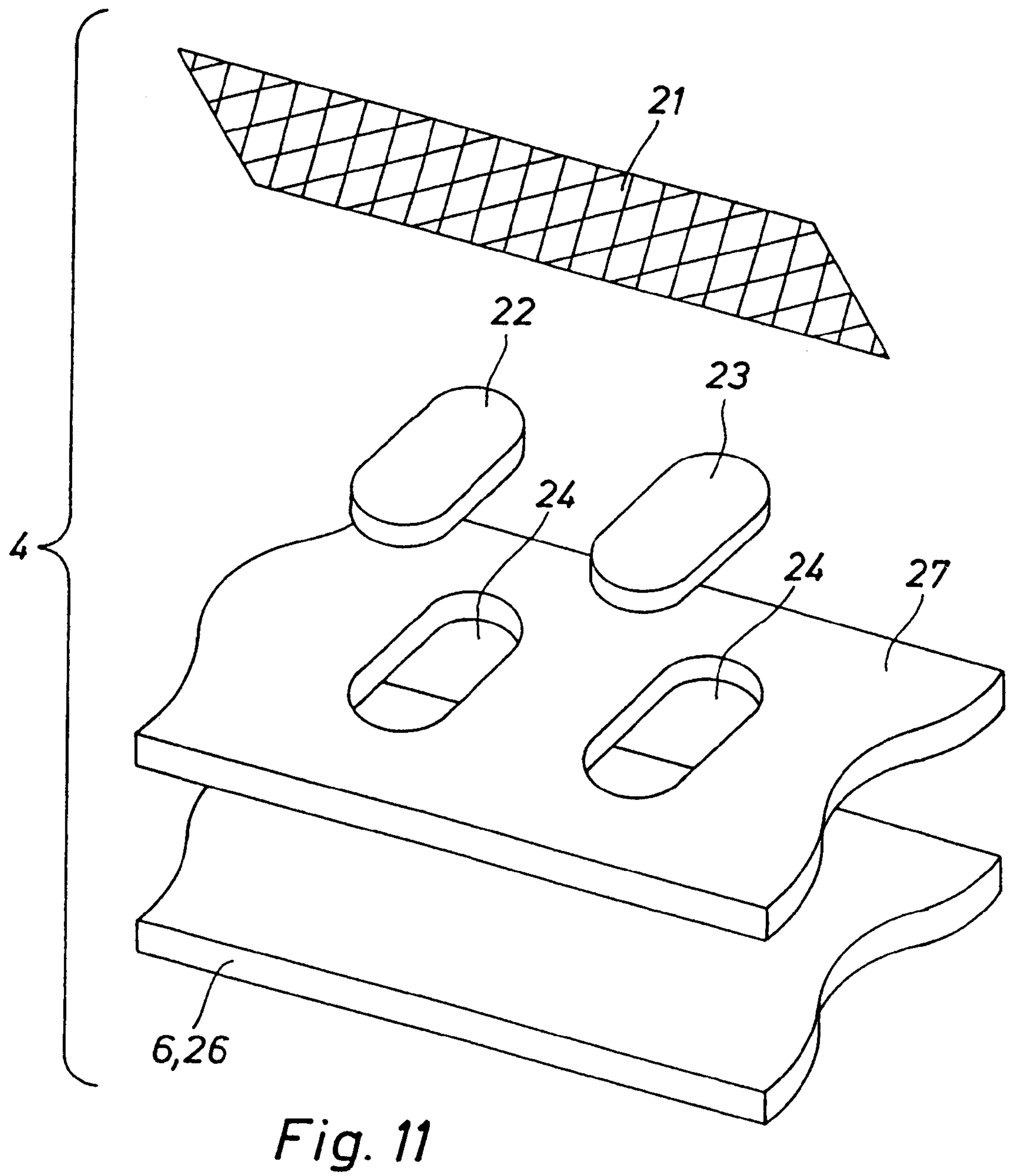
FIG. 11 shows an exploded view of the mounting mat according to FIG. 10.

The fifth embodiment variant according to FIGS. 10 and 11 corresponds essentially to that according to FIGS. 6 and 7. However, not only are local areas of thickened material 22, 23 of an oval shape provided, but thickness and pressure compensation is provided for the above-mentioned ovals over the entire extension of the mat by means of an intermediate mat 27 (swelling mat, fiber mat), which has oval perforations 24 for the positive-locking fitting of the ovals.

Figure 12:
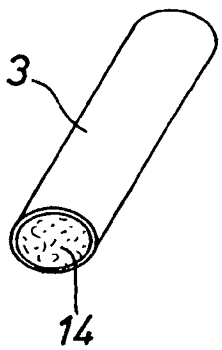
FIG. 12 shows a schematic perspective view of a tubular housing with a surface roughened up on the inside.

In another design of the present invention, the holding forces between the mounting mat 4 and the tubular housing 3 can be brought about in a specific manner by positive locking, especially by increasing the surface roughness, before or during the assembly of an exhaust gas unit. In particular, the surface roughness can be increased by milling or etching in rough areas. FIG. 12 correspondingly shows an oval tubular housing 3 with a surface 14 roughened on the inside for the positive-locking holding of a mounting mat 4 to be accommodated. A lubricant is used as an assembly aid for pushing in the mounting mat.

Figure 13:
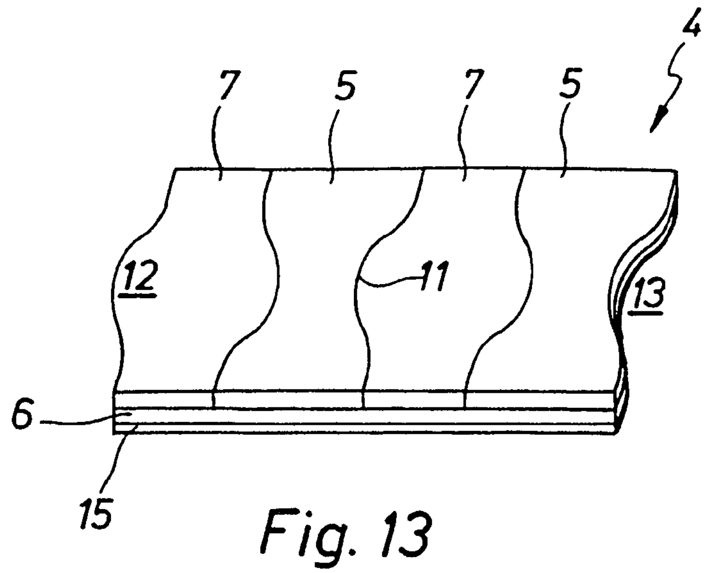
FIG. 13 shows another multilayer mounting mat in a view similar to FIG. 1.

FIG. 13 illustrates the design of a multilayer mounting mat 4. A layer of an individual mat consisting alternatingly of swelling mat sections 5 for expansion at high temperature and erosion-resistant fiber mat sections 7, where the connecting joint has a wavy shape 11, is located inside in close proximity of the monoliths 1, 2. A phenolic resin film carrier 15 designed as an adhesive layer is located on the outside in the direction of the inside of the tubular housing 3. A layer of another swelling mat 6 of such a consistency of mica components that expansion occurs already at low temperature is located between the adhesive layer and the above-mentioned combined individual mat. A preassembled phenolic resin adhesive film 15 is arranged on the outside of the mounting mat 4 for assembly and is inserted together with the mounting mat 4 and is bonded to the inside of the tubular housing 3 during the operation of the exhaust gas unit during heating on the outside.

Figure 14:
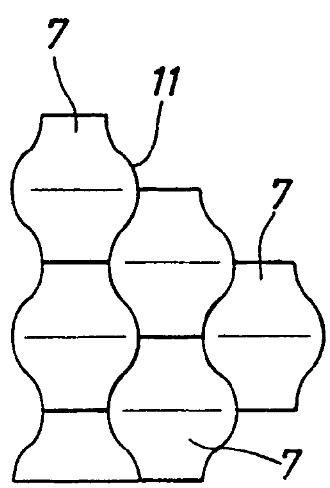
FIG. 14 shows the raw material of a fiber mat immediately after a wave-shaped cut to represent the blank without waste of material due to clippings.

As can be determined from FIG. 14, a fiber mat 4 can be prepared in the form of a wave-shaped blank 11 without cutting waste.

Figure 15:
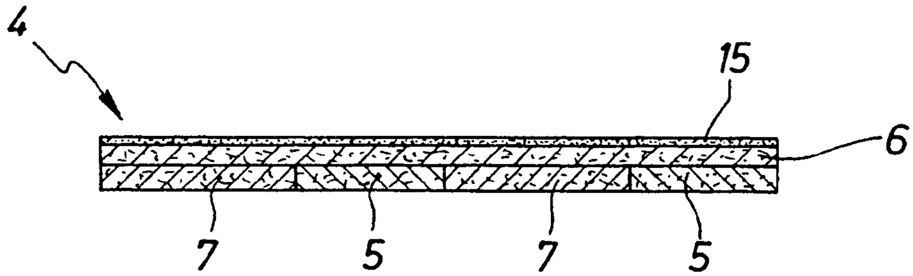
FIG. 15 shows a schematic sectional view of a multilayer mounting mat.
Figure 16:
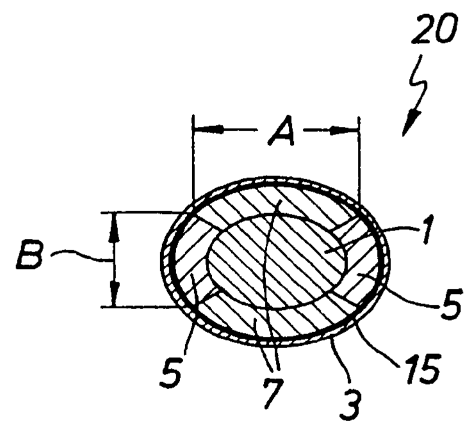
FIG. 16 shows the cross section of the oval tubular housing with mounted multilayer mounting layer according to FIG. 13 and ceramic monolith according to FIG. 2.

FIG. 15 illustrates a cross section through a multilayer mounting mat 4, while FIG. 16 shows the overall arrangement of the exhaust gas unit 20 after mounting in a schematic cross section.

FIG. 18 shows a motor vehicle exhaust gas unit 20 with an oval tubular housing 3, in which two ceramic monoliths 1, 2 are arranged one behind the other.

The ceramic monoliths 1, 2 are held in a wrapped-around mounting mat 4.

The mounting mat 4 according to FIG. 18, top, is composed of felt fibers 8 which are arranged obliquely to the axial axis at an angle α of approx, 30° and are bonded at the end to the interfaces 9, 10.

The mounting mat 4 according to FIG. 18, bottom, is composed of fibers that extend in loops over the thickness of the mounting mat, wherein the loops 11 are bonded in the area of the interfaces 9, 10.

It shall also be noted that the independently patentable features contained in the subclaims shall have corresponding independent protection despite the formal reference to the principal claim. All the inventive features contained in the entire application documents also fall within the scope of protection of the present invention.

While specific embodiments of the invention have been shown and described in detail to illustrate the application of the principles of the invention, it will be understood that the invention may be embodied otherwise without departing from such principles.

What is claimed is:

1. A ceramic monolith mount, comprising:

a motor vehicle exhaust unit housing with a preferably nonround housing shape formed of one of a pipe or half shells;

a mounting mat with at least one swelling mat, the mounting mat being a multilayer mat with different swelling mats with expanded mica mat structure and/or fiber mat structure provided on an inside and on an outside, the mount being formed by the steps of:

wrapping a mounting mat around the ceramic monolith;

mounting the wrapped monolith in the housing;

providing the mounting mat with the at least one said swelling mat which is a mixture of ceramic fibers, expanded mica and organic binder;

treating one or both of the mounting mat and the housing chemically and/or structurally for minimizing the erosion at least in an erosion risk area or in the area in which damage has occurred, wherein a combination of said swelling mat and fiber mat sections are arranged one behind the other to form said mounting mat, wherein the connection joint of the individual swelling mat and fiber mat sections has a wavy shape.

2. A ceramic monolith mount in accordance with claim 1, wherein said fiber mat structure of said mounting mat is a shear-resistant mat.

3. The ceramic monolith mount in accordance with claim 1, wherein an individual mat of said mounting mat or said mounting mat is composed, in the circumferential direction from the ceramic monolith, of swelling mat sections and intercalated fiber mat sections without granular components and without expanded mica, said fiber mat sections being associated with said areas at risk of erosion, wherein the connection edges between said swelling mat sections and said fiber mat sections have a mutually meshing joint in a wavy shape to form erosion-resistant fiber mat sections and said individual mat faces said ceramic monolith.

4. Mounting in accordance with claim 3, wherein said erosion-resistant fiber mat sections have wave-shaped tongues and said swelling mat sections are pressure-resistant swelling mat sections with wave-shaped cutouts.

5. A ceramic monolith mount for holding a ceramic monolith in a motor vehicle exhaust unit housing formed of one of a pipe or half shells, the ceramic monolith mount comprising:

a mounting mat extending around the ceramic monolith in a circumferential direction within the exhaust unit housing, said mounting mat including plural swelling mat sections and plural fiber mat sections with each fiber mat section arranged adjacent to a swelling mat section with respect to the circumferential direction within the exhaust unit housing, each of said swelling mat sections having a joint edge of wave shape and each of said fiber mat sections having a joint edge of a complementary wave shape with each fiber mat section joint edge abutting and engaging a swelling mat section joint edge to form a mutually meshing joint in a wave shape.

6. A ceramic monolith mount according to claim 5, wherein said mounting mat is multilayered with each layer having said mutually meshing joints between adjacent swelling mat sections and fiber mat sections.

7. A ceramic monolith mount according to claim 6, wherein the mutually meshing joints of one layer are offset from the mutually meshing joints of an adjacent layer.

8. A ceramic monolith mounting mat in accordance with claim 7, wherein said joint edge of wave shape in each of said fiber mat sections have tongues and said joint edge of said swelling mat sections have cutouts defining a region dimensioned for receiving said tongues.

9. A ceramic monolith mount for holding the ceramic monolith in motor vehicle exhaust unit housing formed of one of a pipe or half shells, the ceramic monolith mount comprising:

a mounting mat extending around the ceramic monolith in a circumferential direction within the exhaust unit housing, said mounting mat including a swelling mat section and an adjacent fiber mat section, said swelling mat section having a joint edge with a shaped undulating curved contour and said fiber mat section having a joint edge with a shaped undulating curved contour, said swelling mat section joint edge shaped contour being complementary to said fiber mat section joint edge shaped contour, ith said swelling mat section joint edge shaped contour abutting with said fiber mat section joint edge shaped contour to form a mutually interengaging joint.

10. A ceramic monolith mount according to claim 9, wherein said mounting mat is multilayered with each layer having said mutually interengaging joints between adjacent swelling mat section and fiber mat section.

11. A ceramic monolith mount according to claim 10, wherein the mutually interengaging joints of one layer are offset from the mutually interengaging joints of an adjacent layer.

12. A ceramic monolith mounting mat in accordance with claim 9, wherein said swelling mat section joint edge shaped contour and said fiber mat section joint edge contour joint edge each have tongues and cutouts defining a region dimensioned for receiving said tongues, wherein tongues of said swelling mat section are interlocked with cutouts of said fiber mat section.

* * * * *